(12) United States Patent
Guen et al.

(10) Patent No.: US 8,932,752 B2
(45) Date of Patent: Jan. 13, 2015

(54) BATTERY HAVING A BENT CASE AND BATTERY PACK INCLUDING THE SAME

(75) Inventors: Minhyung Guen, Yongin-si (KR); Sangwon Byun, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 605 days.

(21) Appl. No.: 13/174,600

(22) Filed: Jun. 30, 2011

(65) Prior Publication Data
US 2012/0171553 A1 Jul. 5, 2012

(30) Foreign Application Priority Data

Jan. 5, 2011 (KR) .................. 10-2011-0000890

(51) Int. Cl.
*H01M 2/08* (2006.01)
*H01M 2/10* (2006.01)
*H01M 2/02* (2006.01)
(Continued)

(52) U.S. Cl.
CPC .......... *H01M 2/1077* (2013.01); *H01M 2/0237* (2013.01); *H01M 2/0245* (2013.01); *H01M 2/263* (2013.01); *H01M 4/70* (2013.01); *H01M 10/0431* (2013.01); *H01M 10/052* (2013.01);
(Continued)

(58) Field of Classification Search
CPC ..... H01M 2/0237; H01M 2/26; H01M 2/263; H01M 2/06; H01M 2/08; H01M 2/0245; H01M 2/1077; H01M 4/70; H01M 10/0431; H01M 10/052; H01M 10/0587; H01M 2002/0205; Y02E 60/122

USPC .......... 429/161, 179, 178, 185, 176, 174, 163
See application file for complete search history.

(56) References Cited

U.S. PATENT DOCUMENTS

2002/0182494 A1 12/2002 Hayashi et al.
2008/0107961 A1 5/2008 Jeong et al.
(Continued)

FOREIGN PATENT DOCUMENTS

JP  2010/153141 A  7/2010
KR  100823193 B1  4/2008
(Continued)

OTHER PUBLICATIONS

English Machine Translation of JP 2010/153141, 28 pages.
(Continued)

*Primary Examiner* — Raymond Alejandro
(74) *Attorney, Agent, or Firm* — Christie, Parker & Hale, LLP

(57) ABSTRACT

A battery includes an electrode assembly having a first electrode plate and a second electrode plate each having an uncoated portion, and a separator located between the first electrode plate and the second electrode plate; a case accommodating the electrode assembly and having an opening; an electrode terminal connected to the electrode assembly and protruding from the case; and a cap assembly comprising a cap plate sealing the opening of the case, wherein the electrode assembly is constructed such that at least one of the uncoated portions of the first and second electrode plates extends along only a portion of the electrode assembly, and wherein the case has a bent portion formed on at least one side to generally correspond to the electrode assembly.

7 Claims, 10 Drawing Sheets

(51) Int. Cl.
*H01M 2/26* (2006.01)
*H01M 4/70* (2006.01)
*H01M 10/04* (2006.01)
*H01M 10/052* (2010.01)
*H01M 10/0587* (2010.01)

(52) U.S. Cl.
CPC ........ *H01M 10/0587* (2013.01); *Y02T 10/7011* (2013.01); *Y02E 60/122* (2013.01)
USPC ............................ 429/185; 429/163; 429/178

(56) References Cited

U.S. PATENT DOCUMENTS

2010/0099023 A1    4/2010  Kuroda et al.
2010/0216009 A1    8/2010  Kim
2011/0081573 A1*   4/2011  Kim et al. .................... 429/186
2011/0274955 A1    11/2011 Park et al.

FOREIGN PATENT DOCUMENTS

| KR | 1020090008087 A | 1/2009 |
| KR | 1020100096755 A | 9/2010 |
| WO | WO 2008/050211 A1 | 5/2008 |
| WO | WO 2011/115464 A2 | 9/2011 |

OTHER PUBLICATIONS

Extended European Search Report dated Feb. 27, 2012 issued by the EPO for corresponding application No. EP 11184130, 5 pages.
KIPO Office action dated Jun. 8, 2012, for Korean priority Patent application 10-2011-0000890, (4 pages).

* cited by examiner

BATTERY HAVING A BENT CASE AND BATTERY PACK INCLUDING THE SAME

CROSS-REFERENCE TO RELATED APPLICATION

This application claims priority to and the benefit of Korean Patent Application No. 10-2011-0000890, filed on Jan. 5, 2011, in the Korean Intellectual Property Office, the entire content of which is incorporated herein by reference.

BACKGROUND

1. Field

The present invention relates to a battery and a battery pack having the same.

2. Description of the Related Art

Unlike a primary battery, a rechargeable battery may be recharged. Low capacity batteries are used for various portable electronic devices such as cellular phones, and camcorders. High capacity batteries are used as the power source for motor drive, such as in hybrid electric vehicles.

Depending on their external shape, rechargeable batteries may be classified into different types, for example cylindrical and prismatic batteries. A typical rechargeable battery is formed by accommodating an electrode assembly formed by inserting a separator between positive and negative electrodes and an electrolyte in a case and installing a cap plate in the case. Electrode terminals, which are exposed to the outside through the cap plate, are connected to the electrode assembly.

SUMMARY

According to aspects of the present invention, a battery is provided having a can constructed to prevent misassembling and a battery pack having the same.

According to one embodiment of the present invention, a battery is provided including an electrode assembly having a first electrode plate and a second electrode plate each having an uncoated portion, and a separator located between the first electrode plate and the second electrode plate; a case accommodating the electrode assembly and having an opening; an electrode terminal connected to the electrode assembly and protruding from the case; and a cap assembly comprising a cap plate sealing the opening of the case, wherein the electrode assembly is constructed such that at least one of the uncoated portions of the first and second electrode plates extends along only a portion of the electrode assembly, and wherein the case has a bent portion formed on at least one side to generally correspond to the electrode assembly.

In one embodiment, the bent portion includes a first bent portion generally corresponding to a side of the first or second electrode plate without the uncoated portion, and a second bent portion extending at an angle from the first bent portion and generally corresponding to the side of the first or second electrode plate without the uncoated portion. The uncoated portion may be electrically connected to an electrode collector plate electrically coupled to the electrode terminal and the electrode collector plate is formed to generally correspond to a length of the uncoated portion. In one embodiment, a length of the second electrode plate uncoated portion is not equal to a length of the first electrode plate uncoated portion, and further, in one embodiment, the first electrode plate uncoated portion and the second electrode plate uncoated portion may extend along only about half of a width the electrode assembly.

According to another embodiment, a battery pack is provided including a plurality of unit batteries stacked together and each having a bent portion formed in at least one side of a case; a first end plate and a second end plate located at opposite ends of the stacked batteries; and side plates extending along the stacked unit batteries and connecting the first and second end plates together.

In one embodiment, the plurality of unit batteries are stacked such that different-polarity electrodes are adjacent to each other. Further, in one embodiment, the first and second end plates each include a plate portion covering a portion of one of the unit batteries and sidewall portions bent and extending from edges of the plate portion, wherein the side plates and the sidewall portions have through-holes, and wherein the plate portion includes a reinforcement portion generally corresponding to the bent portion of each of the unit batteries.

Additionally, in one embodiment, the reinforcement portion includes a first reinforcement portion generally corresponding to a first bent portion having a first height in the stacked unit batteries, and a second reinforcement portion extending from the first reinforcement portion and corresponding to a second bent portion having a second height that is smaller than the first height in the stacked unit batteries. The reinforcement portion may have through-holes formed at one side thereof, wherein the through-holes are fixedly connected to a respective one of the end plates using bolts.

In one embodiment, the reinforcement plate includes a body portion generally corresponding to a short side surface of the unit batteries, a first reinforcement portion generally corresponding to a first bent portion having a first height, a second reinforcement portion extending from the first reinforcement portion and generally corresponding to a second bent portion having a second height smaller than the first height, and a fixing portion having through-holes to fix the reinforcement plate to the first and second end plate.

As described above, since the battery allows differentiation between a positive electrode and a negative electrode by using different heights for lower ends of a can, the battery pack can be prevented from being misassembled.

In addition, in the battery according to an embodiment of the present invention, an electrode uncoated portion is minimized and a case is formed in a shape corresponding to the electrode uncoated portion, thereby minimizing the battery cell size and weight.

Further, since the battery pack according to an embodiment of the present invention includes a battery capable of discriminating between a positive electrode and a negative electrode, misassembling can be prevented. In addition, since the weight of the battery is minimized, the overall weight of the assembled battery pack can also be minimized. Further, the battery pack is assembled by inserting a reinforcement plate in a recessed portion of the battery.

Additional aspects and/or advantages of the invention will be set forth in part in the description which follows.

BRIEF DESCRIPTION OF THE DRAWINGS

The objects, features and advantages of the present invention will be more apparent from the following detailed description in conjunction with the accompanying drawings, in which.

DETAILED DESCRIPTION

Figure 1:
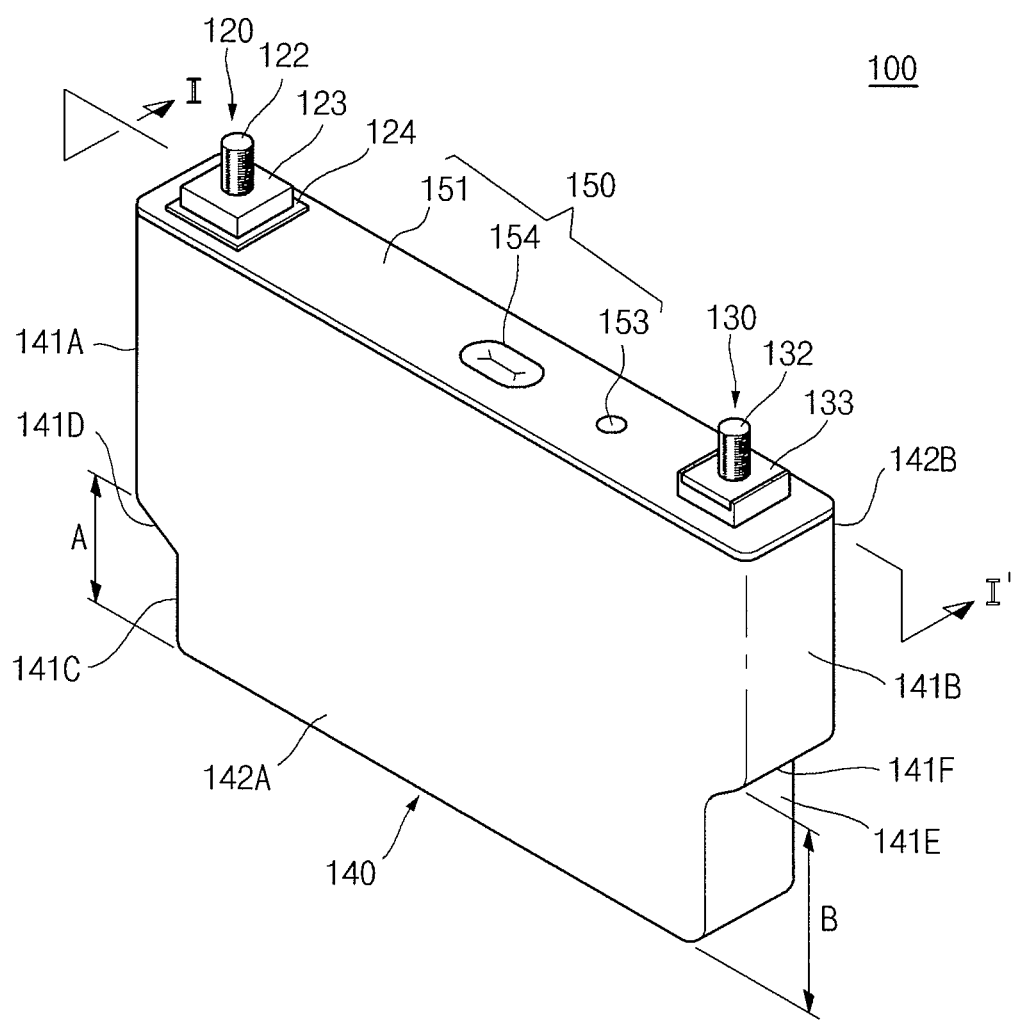
FIG. 1 is a perspective view of a battery according to an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

Throughout the specification, the same reference numerals refer to the same elements. Further, when it is stated herein that one part is "connected" to another part, the one part may be directly connected to the other part, or the one part and the other part may be electrically connected at respective sides of another device or conductive element.

Figure 2:
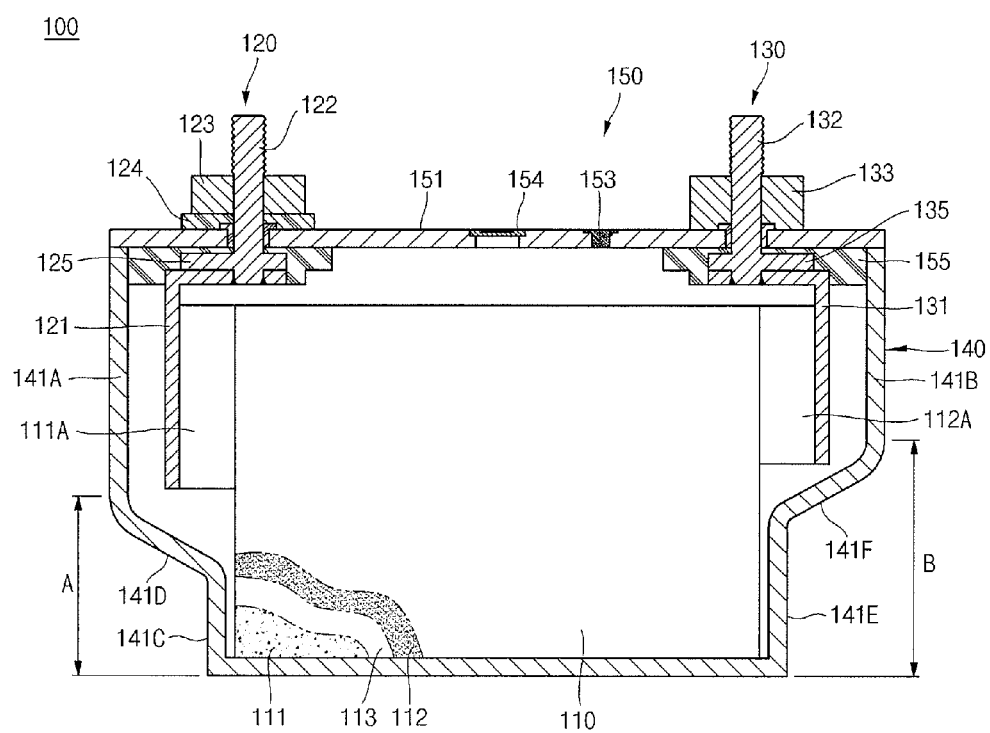
FIG. 2 is a cross-sectional view of FIG. 1.

FIG. 1 is a perspective view of a battery according to an embodiment of the present invention, and FIG. 2 is a cross-sectional view of FIG. 1.

Referring to FIGS. 1 and 2, the battery 100 according to the illustrated embodiment includes an electrode assembly 110, electrode terminals 120 and 130, a case 140, and a cap assembly 150.

The electrode assembly 110 may formed by winding or stacking a stack of a first electrode plate 111, a separator 113 and a second electrode plate 112, which are formed in thin plates or layers. Here, the first electrode plate 111 may operate as a negative electrode, and the second electrode plate 112 may operate as a positive electrode, and vice versa. In addition, polarities of the first electrode plate 111 and the second electrode plate 112 may be reversed.

The first electrode plate 111 is formed by coating a first electrode active material made of graphite or carbon on a first electrode current collector formed of a metal foil made of copper or nickel, and includes a first electrode uncoated portion 111A where a first electrode active material is not formed. The present invention is not limited to the materials of the first electrode plate 111 listed herein. The first electrode uncoated portion 111A is coupled to a first collector plate 121 to be described later by ultrasonic welding and generally corresponds to a flow of current between the first electrode plate 111 and the outside of the first electrode plate 111.

The second electrode plate 112 is formed by coating a second electrode active material made of, for example, a transition metal oxide on a second electrode current collector formed of a metal foil made of, for example, aluminum, and includes a second electrode uncoated portion 112A where a second electrode active material is not formed. The present invention is not limited to the materials of the second electrode plate 112 listed herein. The second electrode uncoated portion 112A is coupled to a second collector plate 131 to be described later by ultrasonic welding and generally corresponds to a flow of current between the second electrode plate 112 and the outside of the second electrode plate 112.

In addition, the electrode assembly 110 is constructed such that a lower end of the first electrode uncoated portion 111A is partially removed or omitted and such that a lower end of the second electrode uncoated portion 112A is partially removed or omitted. In such a case, the first electrode uncoated portion 111A may be longer than the second electrode uncoated portion 112A. Conversely, the second electrode uncoated portion 112A may be longer than the first electrode uncoated portion 111A.

The electrode assembly 110 has uncoated portions 111A and 112A with different lengths formed at its opposite sides.

The separator 113 is positioned between the first electrode plate 111 and the second electrode plate 112 to prevent a short circuit and to allow lithium ions to move. The separator 113 may be formed of a composite film of polyethylene and polypropylene, but the present invention is not limited to the materials of the separator 113 listed herein.

The electrode assembly 110 and an electrolytic solution are accommodated into the case 140. The electrolytic solution may be prepared by dissolving a lithium salt such as $LiPF_6$ or $LiBF_4$ in an organic solvent such as ethylene carbonate (EC), propylene carbonate (PC), diethyl carbonate (DEC), ethyl methyl carbonate (EMC), or dimethyl carbonate (DMC). In addition, the electrolytic solution may be in a liquid, solid or gel phase.

A first terminal 120 and a second terminal 130 electrically connected to the first electrode uncoated portion 111A and the second electrode uncoated portion 112A, respectively, are coupled to opposite ends of the electrode assembly 110.

The first terminal 120 is generally made of a metal or equivalents thereof and is electrically connected to the first electrode uncoated portion 111A. The first terminal 120 includes a first collector plate 121, a first collector terminal 122, and first terminal plate 123.

The first collector plate 121 contacts the first electrode uncoated portion 111A formed in the electrode assembly 110. In practice, the first collector plate 121 is welded to the first electrode uncoated portion 111A. The first collector plate 121 is substantially "Γ" or "L" shaped, and has a terminal hole formed thereon. The first collector terminal 122 is fitted into and coupled to the terminal hole. The first collector plate 121 is made of, for example, copper or a copper alloy, but the present invention is not limited to the materials of the first collector plate 121 listed herein.

In addition, the first collector plate 121 is formed to generally correspond to the length of the first electrode uncoated portion 111A.

The first collector terminal 122 upwardly protrudes from the cap plate 151 to be described later. In addition, the first collector terminal 122 is electrically connected to the first collector plate 121 within the case 140 and the cap plate 151. The first collector terminal 122 upwardly protrudes from the cap plate 151, and a flange 125 that laterally extends is formed within the case 140 and cap plate to prevent the first collector terminal 122 from being dislodged from the cap plate 151.

In the first collector terminal 122, a region formed under the flange 125 is fitted into and welded to the terminal hole of the first collector plate 121 and a region formed on the flange 125 is fixed on the first terminal plate 123. In addition, the first collector terminal 122 is electrically insulated from the cap plate 151. The first collector terminal 122 is made of, for example, at least one selected from copper, a copper alloy and equivalents thereof, but the present invention is not limited to the materials of the first collector terminal 122 listed herein.

The first terminal plate 123 may have a through-hole formed in a substantially vertical direction at its central portion so that the first collector terminal 122 passes therethrough and is connected thereto. Meanwhile, the first terminal plate 123 may be made of at least one selected from stainless steel, copper, a copper alloy, aluminum, an aluminum alloy, and equivalents thereof, but is not limited thereto. An upper insulator 124 may further be provided to insulate the first terminal plate 123 and the cap plate 151 from each other.

The second terminal 130 may also be made of a metal or equivalents thereof, and is electrically connected to the second electrode uncoated portion 112A. The second terminal 130 includes a second collector plate 131, a second collector terminal 132, and a second terminal plate 133. Here, the second terminal 130 may have substantially the same configuration as the first terminal 120, and a detailed description thereof will not be given. However, the second collector plate 131 and the second collector terminal 132 may generally be made of at least one selected from aluminum, an aluminum alloy, and equivalents thereof, but not limited thereto. In addition, the second terminal plate 133 may generally be made of at least one selected from stainless steel, aluminum, an aluminum alloy, copper, a copper alloy, and equivalents thereof, but the present invention does not limit the material of the second terminal plate 133 thereto.

The second collector plate 131 may be formed to generally correspond to the length of the second electrode uncoated portion 112A. Therefore, the first collector plate 121 and the second collector plate 131 are formed to have different thicknesses.

The second terminal plate 133 and the cap plate 151 may be electrically connected to each other. Therefore, the case 140 and the cap plate 151, which will be described below, may have the same polarity with the second terminal 130 (for example, a positive polarity).

The case 140 may be made of aluminum, an aluminum alloy or a conductive metal such as nickel plated steel and has a shape of a substantially rectangular box having an opening in which the first terminal 120 and the second terminal 130 can be inserted and placed. The case 140 may have a pair of short side surfaces 141A and 141B, and a pair of long side surfaces 142A and 142B. The rechargeable battery 100 is formed such that the cap assembly 150 is engaged with the opening of the case 140 to seal an upper portion of the case 140.

An inner surface of the case 140 is insulated so that the case 140 is electrically insulated from the electrode assembly 110, the first terminal 120, the second terminal 130 and the cap assembly 150.

The case 140 is shaped to generally correspond to the electrode assembly 110. Portions shaped to correspond to the first electrode uncoated portion 111A and the second electrode uncoated portion 112A of the electrode assembly 110 may be formed at opposite sides of the case 140. In other words, the case 140 includes a first short side surface 141A corresponding to the first electrode uncoated portion 111A. In addition, the case 140 includes a second short side surface 141B corresponding to the second electrode uncoated portion 112A. If the first electrode uncoated portion 111A and the second electrode uncoated portion 112A have different lengths, the first short side surface 141A and the second short side surface 141B also have different lengths.

In addition, portions of lower ends of the uncoated portions 111A and 112A of the electrode assembly 110 are removed or omitted by different lengths. Therefore, the case 140 has bent portions formed at opposite sides to generally correspond to the first electrode uncoated portion 111A and the second electrode uncoated portion 112A. The bent portions include first through fourth bent portions 141C, 141D, 141E, and 141F. The first bent portion 141C corresponds to a side end of the omitted first electrode uncoated portion 111A. The second bent portion 141D extends from the first bent portion 141C and corresponds to a lower end of the omitted first electrode plate uncoated portion 111A.

The third bent portion 141E corresponds to a side end of the omitted second electrode uncoated portion 112A. The fourth bent portion 141F extends from the third bent portion 141E and corresponds to a lower end of the omitted second electrode plate uncoated portion 112A.

The bent portion formed at a location corresponding to the first electrode terminal 120 of the case 140 may be formed to a height A of about 21 mm, and the bent portion formed at a location corresponding to the second electrode terminal 130 may be formed to a height B of about 31 mm. In this case, the first electrode terminal 120 and the second electrode terminal 130 may become bent portions of the case 140.

The cap assembly 150 includes a cap plate 151, an electrolytic solution injection hole, a plug 153 and a safety vent 154.

The cap plate 151 seals the case 140. The cap plate 151 has a hole formed at a portion thereof to allow the first electrode terminal 120 connected to the first collector plate 121 to be inserted thereto and a hole to allow the second electrode terminal 130 connected to the second collector plate 131 to be inserted thereto. Each of the electrode terminals 120 and 130 has a gasket insulating the cap plate 151. In addition, each of the electrode terminals 120 and 130 may have a nut D engaged with a thread formed thereon to then be fixed on the cap plate 151. The cap assembly 150 may include the plug 153 sealing the electrolytic solution injection hole after injecting an electrolytic solution through the electrolytic solution injection hole formed in the cap plate 151. The cap plate 151 may also include the safety vent 154 having a small thickness and configured to be ruptured at a threshold pressure to release internal gas.

The insulation member 155 is formed within the case and the cap plate 151 and prevents an unnecessary electrical short between the cap plate 151 and each of the electrode terminals 120 and 130. In other words, the insulation member 155 prevents an electrical short between each of the first collector plate 121 and the first collector terminal 122 and the cap plate 151. In addition, the insulation member 155 prevents an electrical short between each of the second collector plate 131 and the second collector terminal 132 and the cap plate 151. In an exemplary embodiment, the insulation member 155 may be made of PPS (polyphenylene sulfide), but the present invention is not limited to the materials of the insulation member 155 listed herein.

Figure 3:
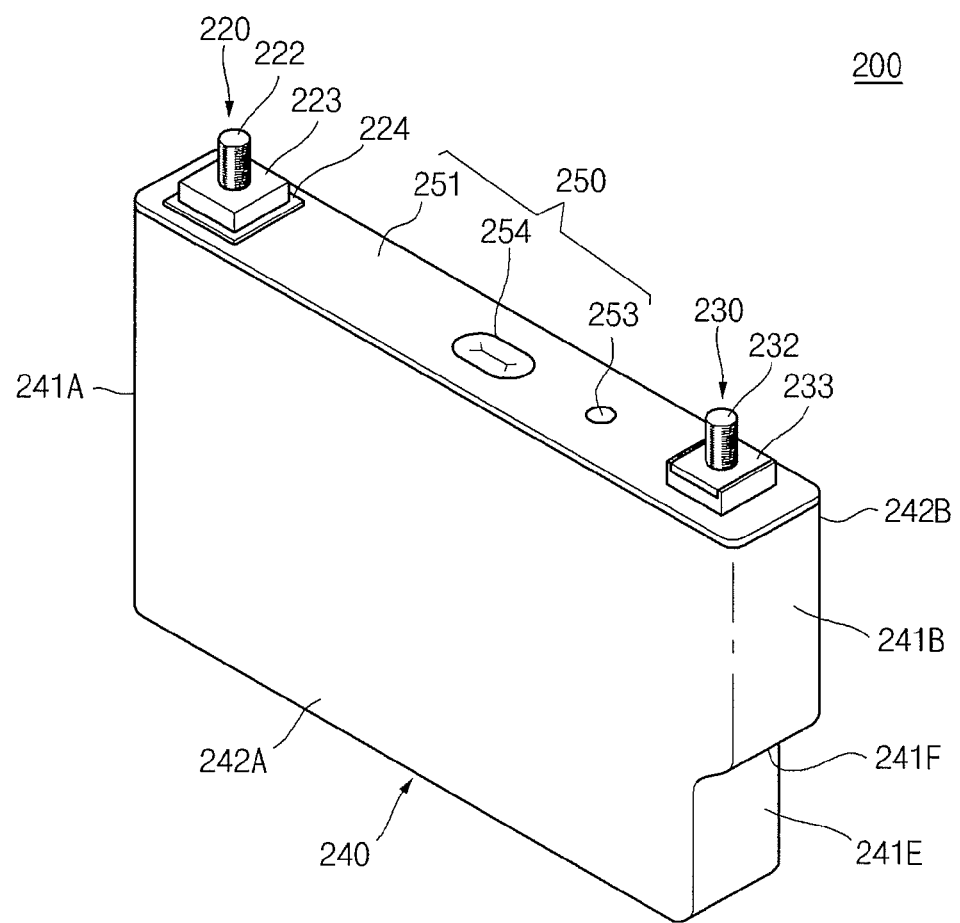
FIG. 3 is a perspective view of a battery according to another embodiment of the present invention.

FIG. 3 is a perspective view of a battery 200 according to another embodiment of the present invention.

Referring to FIG. 3, the battery 200 includes an electrode assembly not shown, electrode terminals 220 and 230, a case 240, and a cap assembly 250. The battery 200 has a bent portion formed at either side surface of the first electrode terminal 220 or the second electrode terminal 230. The battery 200 has a removed or omitted uncoated portion of the electrode assembly accommodated therein to correspond to a bent portion of the case 240. The battery 200 has the same configuration as the battery 100 according to the previous embodiment of the present invention. Accordingly, repeated explanations of the same functional components will not be given and only the case 240 will now be described.

The case 240 may have a pair of short side surfaces 241A and 241B, and a pair of long side surfaces 242A and 242B. The pair of short side surfaces 241A and 241B include a first short side surface 241A and a second short side surface 241B. The case 240 is formed to generally correspond to a removed portion of the electrode assembly. The removed uncoated portion may be a portion of the first electrode uncoated portion or a portion of the second electrode uncoated portion.

As shown in FIG. 3, a portion of a lower end of the second electrode uncoated portion connected to the second electrode terminal 230. In one embodiment, the second short side surface 241B includes a third bent portion 241E extending about the case 240 and corresponding to the lower end of the second electrode uncoated portion. In addition, the third bent portion 241E includes a fourth bent portion 241F corresponding to a removed side surface of the second electrode uncoated portion. In addition, a portion of a lower end of the first electrode uncoated portion may be removed. In this case, the case 240 may be formed such that a portion of the lower end of the first electrode uncoated portion corresponding to the first electrode terminal 220 may be bent.

In the battery 200, the first electrode terminal 220 and the second electrode terminal 230 are differentiated by a location of the bent portion formed in the case 240.

Figure 4:
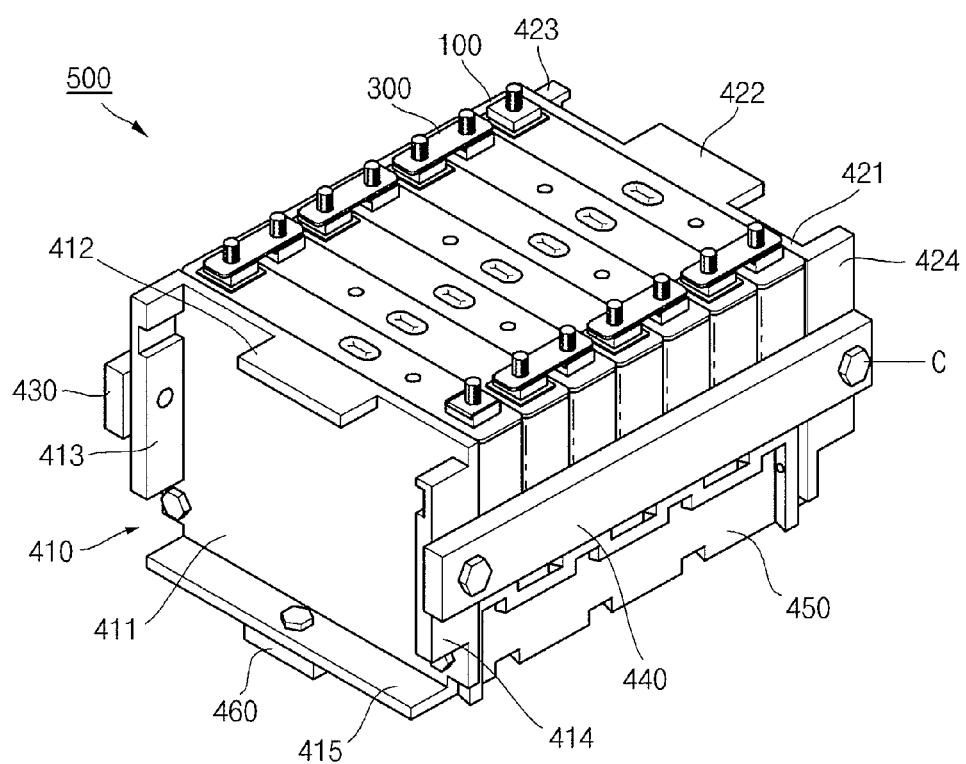
FIG. 4 is a perspective view of a battery pack having the battery shown in FIG. 1 assembled therein according to an embodiment of the present invention.
Figure 5:
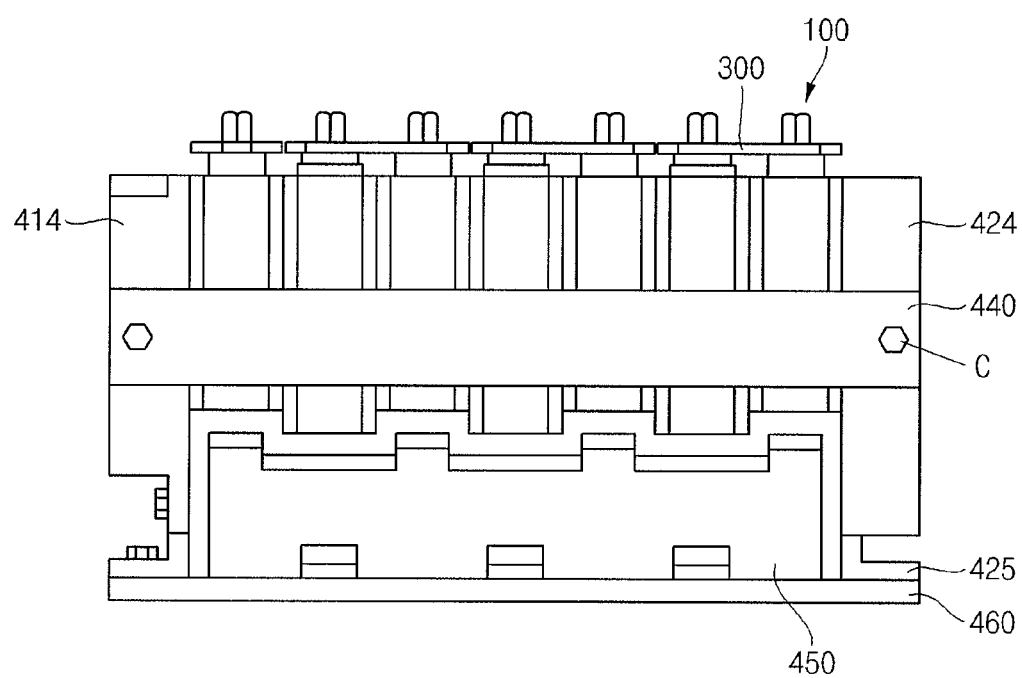
FIG. 5 is a side view of FIG. 4.
Figure 6:
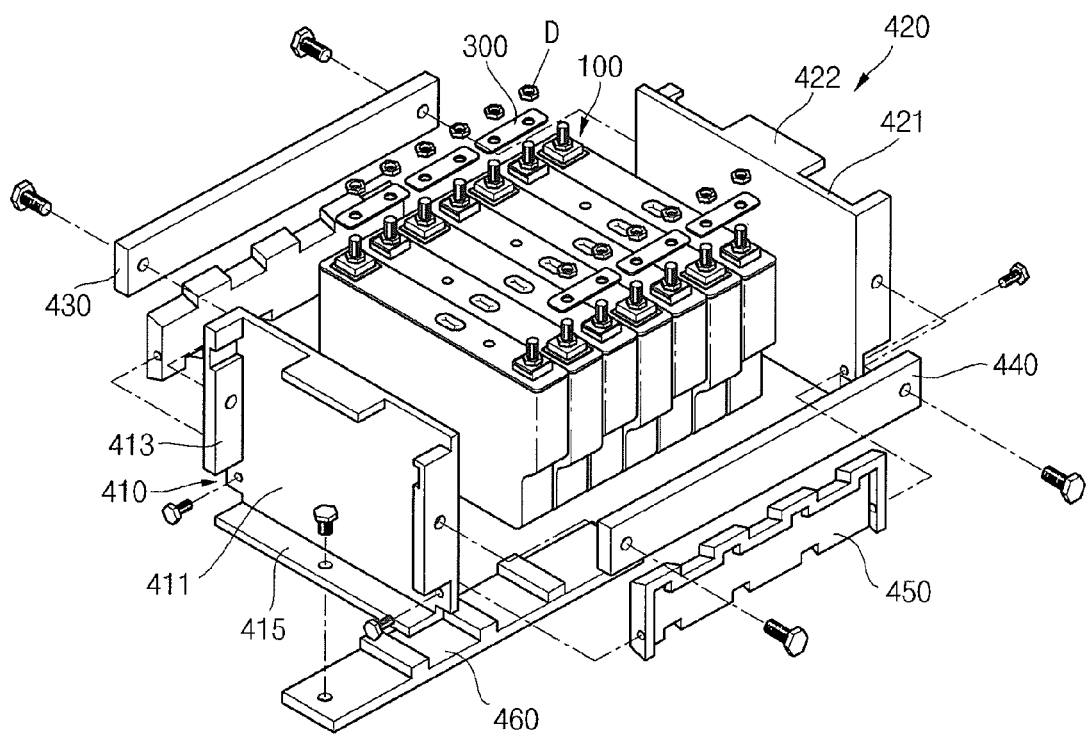
FIG. 6 is an exploded view of FIG. 4.
Figure 7:
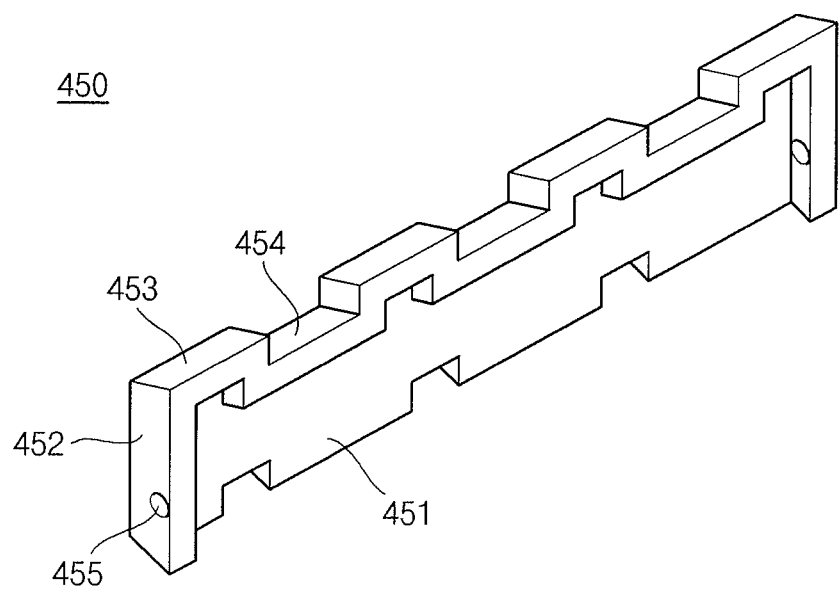
FIG. 7 is a perspective view of a reinforcement plate shown in FIG. 4.

FIG. 4 is a perspective view of a battery pack having the battery shown in FIG. 1 assembled therein according to an embodiment of the present invention, FIG. 5 is a side view of FIG. 4, FIG. 6 is an exploded view of FIG. 4, and FIG. 7 is a perspective view of a reinforcement plate shown in FIG. 4.

Referring to FIGS. 4 through 7, the battery pack 500 according to the illustrated embodiment includes a battery 100, end plates 410 and 420, and side plates 430, 440, and 460. In addition, the battery pack 500 further includes a reinforcement plate 450.

The battery 100 of the illustrated embodiment has the same configuration as the battery according to the previous embodiment. Accordingly, repeated explanations of the same functional components will not be given and only a coupling member, that is, the end plates 410 and 420, and the side plates 430, 440, and 460 will now be described.

As shown in FIGS. 4 through 6, the battery pack 500 includes first and second end plates 410 and 420, wherein one of the first and second end plates 410 and 420 is located on either end of the stacked unit batteries 100. The first end plate 410 and the second end plate 420 are substantially the same with respect to configuration and function. Thus, only the first end plate 410 will be described below.

The first end plate 410 includes a plate portion 411, first through fourth sidewall portions 412, 413, 414 and 415, and through-holes.

In the first end plate 410, side plates 430, 440 and 460 are positioned on side surfaces of the respective unit batteries, bolts C pass through the through-holes and nuts are fastened therewith to then be fixed. Here, the side plates 430, 440 and 460 connect the first and second end plates 410 and 420 located at front and rear surfaces.

The plate portion 411 covers a long side (planar) surface of an end battery of the stacked unit batteries. The plate portion 411 includes a through-hole, which is formed at a location generally corresponding to the through-hole of the reinforcement plate 450.

The first through fourth sidewall portions 412, 413, 414, and 415 are bent and extend from edges of the plate portion 411 and include through-holes that are engaged with the side plates 430, 440 and 460.

The side plates 430, 440 and 460 are plate-shaped, and have through-holes formed at opposite sides thereof. The through-holes formed at the side plates 430, 440 and 460 are formed at locations corresponding to the through-holes formed at the sidewall portions 412, 413, 414, and 415. In this case, the side plate 460 formed at a bottom portion of the battery pack 500 may have a protrusion generally corresponding to a gap between unit batteries 100.

The battery pack 500 includes a stack of a plurality of unit batteries 100 having a bent portion at the lower portion of the case 140 with different heights. The unit batteries 100 are stacked such that different-polarity electrodes alternate each other. Since the unit batteries 100 have the lower bent portions formed with different heights, the polarities of electrode terminals can be differentiated using the bent portion of the case 140. Therefore, when the unit batteries 100 are stacked such that different-polarity electrodes alternate each other, it is possible to prevent the unit batteries 100 from being misassembled. In the battery pack 500, the plurality of unit batteries 100 are stacked with alternating different-polarity electrodes so that the battery pack 500 has a regular height difference at one side of the lower portion thereof.

FIG. 7 is a perspective view of a reinforcement plate shown in FIG. 4.

Referring to FIG. 7, the reinforcement plate 450 includes a body portion 451, fixing portion 452, a first reinforcement portion 453, and a second reinforcement portion 454.

The reinforcement plate 450 shaped to correspond to a height difference of the bent portion is inserted into the battery pack 500, thereby fixing the battery pack 500.

The body portion 451 is oriented to be generally parallel with lower portions of short side surfaces of the unit batteries 100. The body portion 451 has fixing portions 452 at its opposite ends, wherein the fixing portions 452 include through-holes. The through-holes are formed at locations generally corresponding to the through-holes formed at the first and second end plates 410 and 420. The through-holes are fixed across bolts C. Here, the bolts are bolt coupling protrusions formed in the through-holes, which may couple the reinforcement plate 450 to the first or second end plate 410 or 420. Alternatively, the bolts may include nuts to couple the first and second end plates 410 and 420.

In the battery 100 shown in FIG. 1, the first reinforcement portion 453 corresponds to the bent portion of the battery 100 having a relatively great height B. In addition, the second reinforcement portion 254 extends from the first reinforcement portion 453 and corresponds to the bent portion of the battery 100 having a relatively small height A. The first reinforcement portion 453 and the second reinforcement portion 454 are formed to correspond to tilted surfaces of the second bent portion 141D and the fourth bent portion 141F in the battery 100.

The reinforcement plate 450 is coupled to both sides of the battery pack 500 in different shapes. For example, the unit batteries 100 are stacked such that the bent portions thereof have heights in orders of B-A-B-A at one side of the battery pack 500 and A-B-A-B at the other side of the battery pack 500. Here, reference characters A and B denote heights of the bent portions of the battery 100 shown in FIG. 1 in the case 140.

The battery pack 500 may be electrically connected by a conductive bus bar 300. Here, the bus bar 300 has through-holes formed at its opposite sides, and the first and second collector terminals 122 and 132 provided in the battery 100 are engaged with the through-holes. In addition, nuts D are engaged with the bus bar 300.

Therefore, the bus bar 300 is tightly coupled to the first collector terminal 122 and the second collector terminal while it is engaged with the first collector terminal 122 and the second collector terminal 132 using the nuts D.

Accordingly, since the bus bar 300 is coupled to the collector terminal 122, 132 using nuts D, engagement between the bus bar 300 and the collector terminal 122, 132 is established. In addition, a relatively large current path is formed through the collector terminal 122, 132, the terminal plate 123, 133 and the bus bar 300, thereby reducing electrical resistance of terminal.

Figure 8:
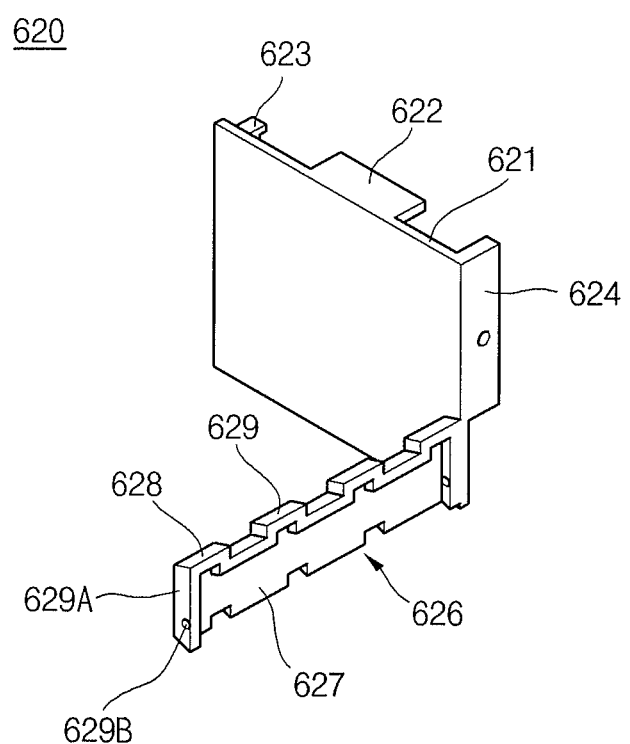
FIG. 8 is a perspective view of an end plate according to another embodiment of the present invention.

FIG. 8 is a perspective view of an end plate 620 according to another embodiment of the present invention.

Referring to FIG. 8, the end plate 620 includes a plate portion 621, sidewall portions 622, 623 and 624, and a reinforcement portion 626. The sidewall portions 622, 623 and 624 correspond to extensions from edges of the plate portion 621. A sidewall portion extending from a bottom surface of the plate portion 621 is not illustrated in FIG. 8.

The plate portion 621 and the sidewall portions 622, 623 and 624 have the same configurations as the first and second end plates 410 and 420 shown in FIG. 6. Accordingly, repeated explanations of the same functional components will not be provided and the following description will focus on the reinforcement portion 626.

The reinforcement portion 626 is formed at one side of the plate portion 621 and may be located to generally correspond to a bent portion formed at a lower portion of one side of the battery pack. The reinforcement portion 626 may be formed in the opposite direction to a direction in which the sidewall portions 622, 623 and 624 are bent. The reinforcement portion 626 includes a first reinforcement portion 628 and a second reinforcement portion 629 sequentially formed to generally correspond to a height difference of bent portions of stacked batteries. The reinforcement portion 626 includes a fixing portion 629A formed at its end, the fixing portion 629A being fixed to an end plate formed in the front or rear surface of the battery pack. The end plate has a through-hole formed at a location corresponding to a through-hole formed at the fixing portion 629A. The through-holes are engaged with each other such that a bolt passes through the through-holes.

In one embodiment, the reinforcement portion 626 may be formed at opposite sides of the plate portion 621 to correspond to the opposite bent portions of the battery. In this case, the end plate formed at the other side of the battery pack may be formed by the plate portion 621 and the sidewall portions 622, 623 and 624.

Figure 9:
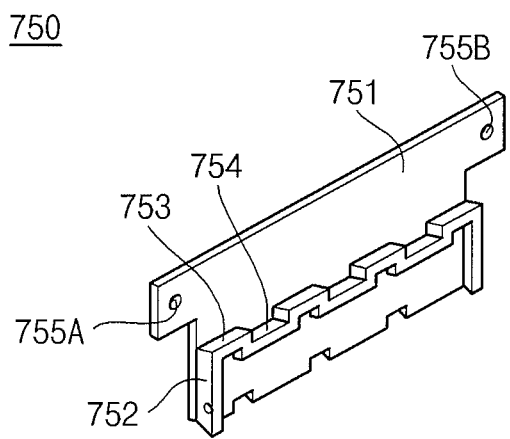
FIG. 9 is a perspective view of a side plate according to still another embodiment of the present invention.

FIG. 9 is a perspective view of a side plate 750 according to still another embodiment of the present invention.

The side plate 750 is formed at both side short side surfaces of the battery pack in the left and right. The side plate 750 is plate-shaped and has through-holes formed at its opposite sides. The side plate 750 includes a first reinforcement portion 753 and a second reinforcement portion 754, which are formed at a lower portion of a lateral base 751.

Bolts C pass through the through-holes 755A and 755B formed at opposite sides of the side plate 750 to be connected to the end plate. In one embodiment, the first reinforcement portion 753 and the second reinforcement portion 754 formed under the side plate 750 correspond to the bent portions of the stacked unit batteries. The first reinforcement portion 753 and the second reinforcement portion 754 are sequentially formed to correspond to the bent portions of the stacked unit batteries. A fixing portion 752 is provided at an end of the reinforcement portion and the fixing portion 752 includes through-holes, wherein the through-holes of the fixing portion correspond to the through-holes formed at the plate portion of the end plate.

Figure 10:
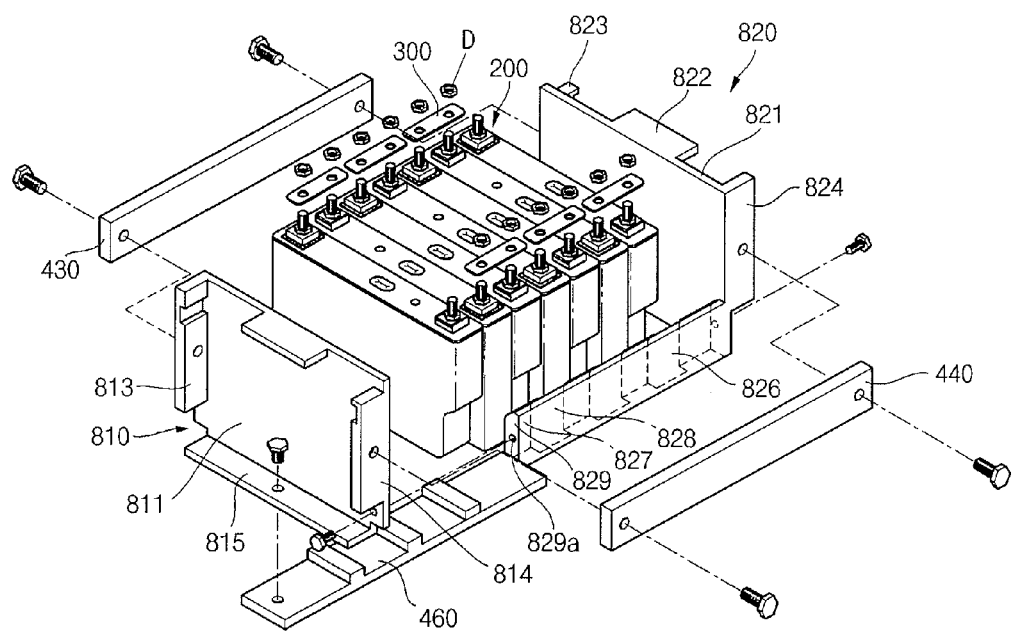
FIG. 10 is an exploded view of a battery pack according to another embodiment of the present invention.

FIG. 10 is an exploded view of a battery pack according to another embodiment of the present invention.

In the battery pack, unit batteries 200, as shown in FIG. 3, are stacked on top of each other such that different-polarity electrodes are alternated. Each of the unit batteries 200 has a bent portion formed at a side surface of the case, corresponding to the first electrode terminal. The first electrode terminal may operate as a positive electrode, or vice versa. In the battery 200, the side surface of the case corresponding to the second electrode terminal may be relatively short. Here, the first electrode terminal and the second electrode terminal can be discriminated by the location of the case where the bent portion is formed.

As shown in FIG. 10, if the unit batteries 200 are stacked on top of each other such that different-polarity electrodes alternate each other, the bent portions and edges of the case without bent portions alternate each other at one side of the lower portion of the battery pack. In one embodiment, a reinforcement portion 826 formed to correspond to the edge of the case is inserted into the battery pack.

The battery pack includes first and second end plates 810 and 820 covering opposing batteries. The first and second end plates 810 and 820 include a reinforcement portion 826 and have substantially the same configuration as the end plate 620 shown in FIG. 8. Accordingly, repeated explanations of the same functional components will not be given and the following description will focus on the reinforcement portion 826 of the second end plate 820.

The reinforcement portion 826 includes a first reinforcement portion 827 and a second reinforcement portion 828. The first reinforcement portion 827 is formed to correspond to third and fourth bent portions 241E and 241F of the battery 200 shown in FIG. 3. The second reinforcement portion 828 is formed to correspond to a short side surface 241A of the case 240, extends from the first reinforcement portion 827, and is recessed relative to the first reinforcement portion 827.

In the second end plate 820, the reinforcement portion 826 may be formed at opposite sides of the plate portion 821 to correspond to the bent portions formed at opposite sides of the lower portion of the battery pack.

Figure 11:
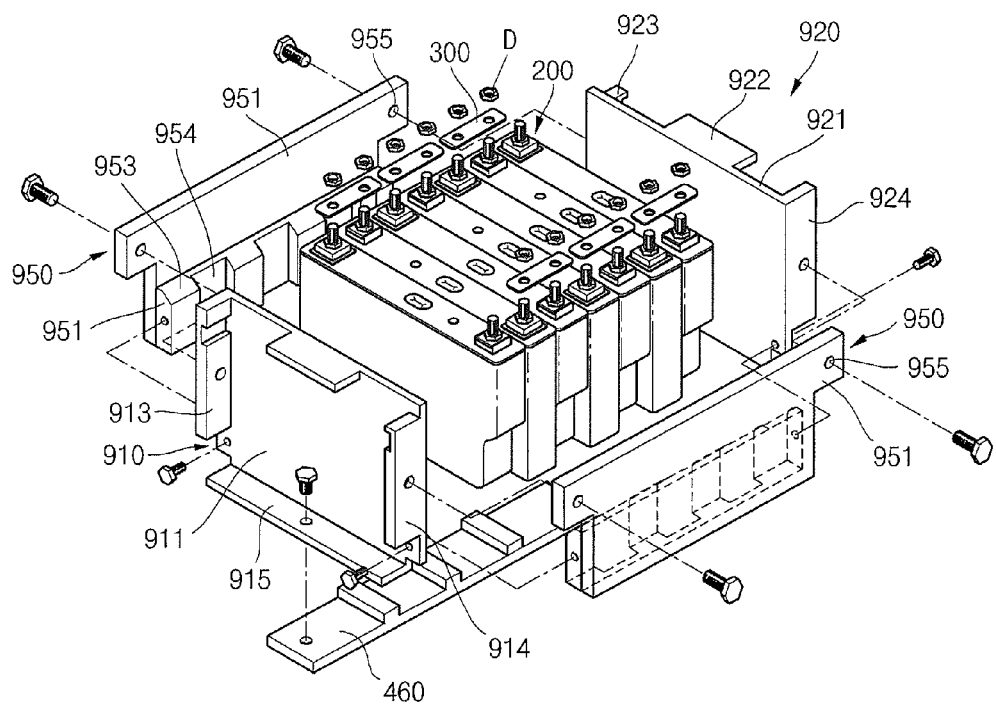
FIG. 11 is an exploded view of a battery pack according to still another embodiment of the present invention.

FIG. 11 is an exploded view of a battery pack according to still another embodiment of the present invention.

The battery pack includes a plurality of unit batteries 200, first and second end plates 910 and 920, and side plates 950 and 460.

The plurality of unit batteries 200 having electrodes of different polarities are stacked in the same manner as in the previous embodiment shown in FIG. 10. The first and second end plates 910 and 920 have the same configurations as the first and second end plates 410 and 420 according to the first embodiment of the present invention. In addition, the side plate 460 formed at a lower portion of the battery pack, has the same configuration as that of the first embodiment of the present invention. Accordingly, repeated explanations of the same functional components will not be given and the following description will focus on the side plates 950 formed at opposite sides of the battery pack.

The side plate 950 includes a first reinforcement portion 953 and a second reinforcement portion 954, which are formed at a lower portion of a lateral base 951 shaped of a plate. The first reinforcement portion 953 and the second reinforcement portion 954 correspond to bent portions 241E and 241F of the plurality of unit batteries 200 stacked and a short side surface 241A of the case 240.

The first reinforcement portion 953 is formed to correspond to third and fourth bent portions 241E and 241F of the battery 200 shown in FIG. 3 and the second reinforcement portion 954 is formed to correspond to the short side surface 241A of the case 240. The second reinforcement portion 954 extends from the first reinforcement portion 953 and is recessed relative to the first reinforcement portion 953.

The battery packs shown in FIGS. 6, 10 and 11 include unit batteries stacked to be capable of differentiating between the first electrode terminal and the second electrode terminal. The unit batteries have bent portions formed on at least one surface of the case. Here, the shape of the case allows differentiation between polarities of electrodes, thereby preventing misassembling in the assembling process of the battery pack. The case has bent portions formed in the left and right sides of the lower end thereof, and a height difference between the bent portions or bent portions formed at one side of the case can discriminate polarities of electrodes. Here, the shape of the case is not limited to that illustrated herein.

In addition, the illustrated battery packs are configured such that a reinforcement member is inserted according to the shape in which the case of the stacked batteries is bent. Here, the reinforcement member may have various shapes according to the shape of the case. In addition, the reinforcement member may be formed of a separate plate, or may be incorporated into the end plate or the side plate.

Although the battery and the battery pack according to the present invention have been illustrated through particular embodiments, it should be understood that many variations and modifications may be made in those embodiments within the scope of the present invention by selectively combining all or some of the illustrated embodiments herein described

What is claimed is:

1. A battery comprising:
    an electrode assembly comprising a first electrode plate and a second electrode plate each having an uncoated portion, and a separator located between the first electrode plate and the second electrode plate;
    a case accommodating the electrode assembly and having an opening, wherein the case has a first side surface and a second side surface opposite to the first side surface, the first and second side surfaces defining a height of the case, and a bottom surface extending between the first and second side surfaces;
    an electrode terminal connected to the electrode assembly and protruding from the case; and
    a cap assembly comprising a cap plate sealing the opening of the case,
    wherein the electrode assembly is constructed such that at least one of the uncoated portions of the first and second electrode plates extends along only a portion of the electrode assembly, and wherein at any cross-section along its width, in a direction extending away from the cap assembly, the first side surface has a first portion contacting the cap plate, a second portion extending from the first portion extending from the first portion at an angle, and a third portion extending from the second portion and contacting the bottom surface.

2. The battery of claim 1, wherein the case includes an insulation member electrically insulated from the electrode assembly.

3. The battery of claim 1, wherein the uncoated portion is electrically connected to an electrode collector plate electrically coupled to the electrode terminal.

4. The battery of claim 3, wherein the electrode collector plate is formed to generally correspond to a length of the uncoated portion.

5. The battery of claim 1, wherein the electrode assembly is constructed such that the first electrode plate uncoated portion and the second electrode plate uncoated portion extend along only a portion of the electrode assembly, and wherein a length of the second electrode plate uncoated portion is not equal to a length of the first electrode plate uncoated portion.

6. The battery of claim 5, wherein the second side surface of the case has, at any cross-section along its width, in a direction extending away from the cap assembly, a first portion contacting the cap plate, a second portion extending from the first portion at an angle, and a third portion extending from the second portion and contacting the bottom surface.

7. The battery of claim 1, wherein the first electrode plate uncoated portion and the second electrode plate uncoated portion extend along only about half of a width of the electrode assembly.

* * * * *